United States Patent [19]

Chevance et al.

[11] Patent Number: 4,657,523

[45] Date of Patent: Apr. 14, 1987

[54] UNIDIRECTIONAL CABLE-TIGHTENING DEVICE FOR A MOTOR VEHICLE GLASS RAISER

[75] Inventors: Claude Chevance, Savigny-sur-Orge; Thierry Pèbre, Paris, both of France

[73] Assignee: Compagnie Industrielle de Mecanisme en abrege C.I.M., France

[21] Appl. No.: 881,411

[22] Filed: Jul. 2, 1986

[30] Foreign Application Priority Data

Jul. 5, 1985 [FR] France .............................. 85 10342

[51] Int. Cl.⁴ ......................... F16H 7/08; E05F 11/48

[52] U.S. Cl. ....................................... 474/101; 49/352

[58] Field of Search ............................... 474/101-104, 474/109-111; 49/352, 360; 254/216, 225, 323

[56] References Cited

U.S. PATENT DOCUMENTS 3,444,649 5/1969 Rivolier ............................... 49/352

4,313,282 2/1982 Hagemann et al. .................. 49/352

FOREIGN PATENT DOCUMENTS 2750904 5/1979 Fed. Rep. of Germany ........ 49/352

*Primary Examiner*—Stephen J. Novosad

*Assistant Examiner*—Thuy M. Bui

[57] ABSTRACT

The device comprises a housing (3) in which are disposed a winch (4) for driving the cable (1) and capable of being driven by a motor (5), and end members (5*a*, 5*b*) each receiving an end portion of a sheath (6) containing the cable. The end members (5*a*, 5*b*) are each elastically biased by a compression spring (8*a*, 8*b*) mounted in the housing (3) coaxially with the cable (1). Each end member (5*a*, 5*b*) is provided on one of its sides with a set of teeth (9*a*, 9*b*) which extends in a direction parallel to the cable (1) and is engaged with a complementary set of teeth (11*a*, 11*b*) of a shoe (12*a*, 12*b*) disposed in the housing (3) in such manner as to be slightly slidable in the transverse direction when the end member (5*a*, 5*b*) of the sheath is moved in a direction parallel to the cable. An arrangement is provided for maintaining the shoes (12*a*, 12*b*) elastically bearing against the toothed side of the associated members (5*a*, 5*b*).

4 Claims, 3 Drawing Figures

UNIDIRECTIONAL CABLE-TIGHTENING DEVICE FOR A MOTOR VEHICLE GLASS RAISER

The present invention relates to a unidirectional cable-tightening device for a motor vehicle glass raiser.

This device is of the type comprising a housing in which are disposed a winch for driving the cable and capable of being driven by a motor, or manually, and two end members, each receiving one end of a sheath containing the cable, these end members being each subjected to the elastic force exerted by a compression spring mounted in the housing coaxially with the cable.

In order to ensure that such a device operate correctly, the cable (Bowden) must be permanently held taut so as to avoid risk of derailment and the production of play at the crank and at the glass. Now, it is observed in practice that, in the course of operation of these glass raisers, there is a substantial stretching of the cable which may be as much as 35 mm for electrical glass raisers.

In order to compensate for this stretching, there are usually employed compression springs mounted between a sheath end member and its support, one spring ensuring the tightening in one direction and the second spring ensuring the tightening of the cable in the other direction. This arrangement solves the problem of the tightening of the cable, but not that of the play which then becomes elastic. This may be easily noticed by bearing against the glass which can indeed be made to descend to the extent to which it is possible to compress the spring (for example 15 to 20 mm).

An object of the invention is to overcome this drawback by providing a rigid connection in the direction of the compression of the sheath, between the end member and its support and which permits the tightening of the cable.

According to the invention, each sheath end member is provided on one of its sides with a set of teeth extending in a direction parallel to the cable and engaging with a complementary set of teeth of a shoe disposed in the housing in such manner as to be slidable slightly in the transverse direction when the sheath end member is moved in a direction parallel to the cable, means being provided for maintaining the shoes elastically bearing against the toothed sides of the associated end members.

Thus, when a slight play appears and one of the portions of the cable is "slack", the considered compression spring slightly biases the corresponding end member whose set of teeth slides on the teeth of the shoe which is slightly shifted back, which ensure the tightening of the cable by progression of one pitch of the set of teeth of the end member relative to the set of teeth of the shoe.

Any elastic play is thus eliminated, except for the play corresponding to one pitch of the set of seeth, i.e. in practice one to two millimeters.

Further features and advantages of the invention will be apparent from the following description, with reference to the accompanying drawings which illustrate by way of a non-limiting example an embodiment. In the drawings.

Figures 1, 3:
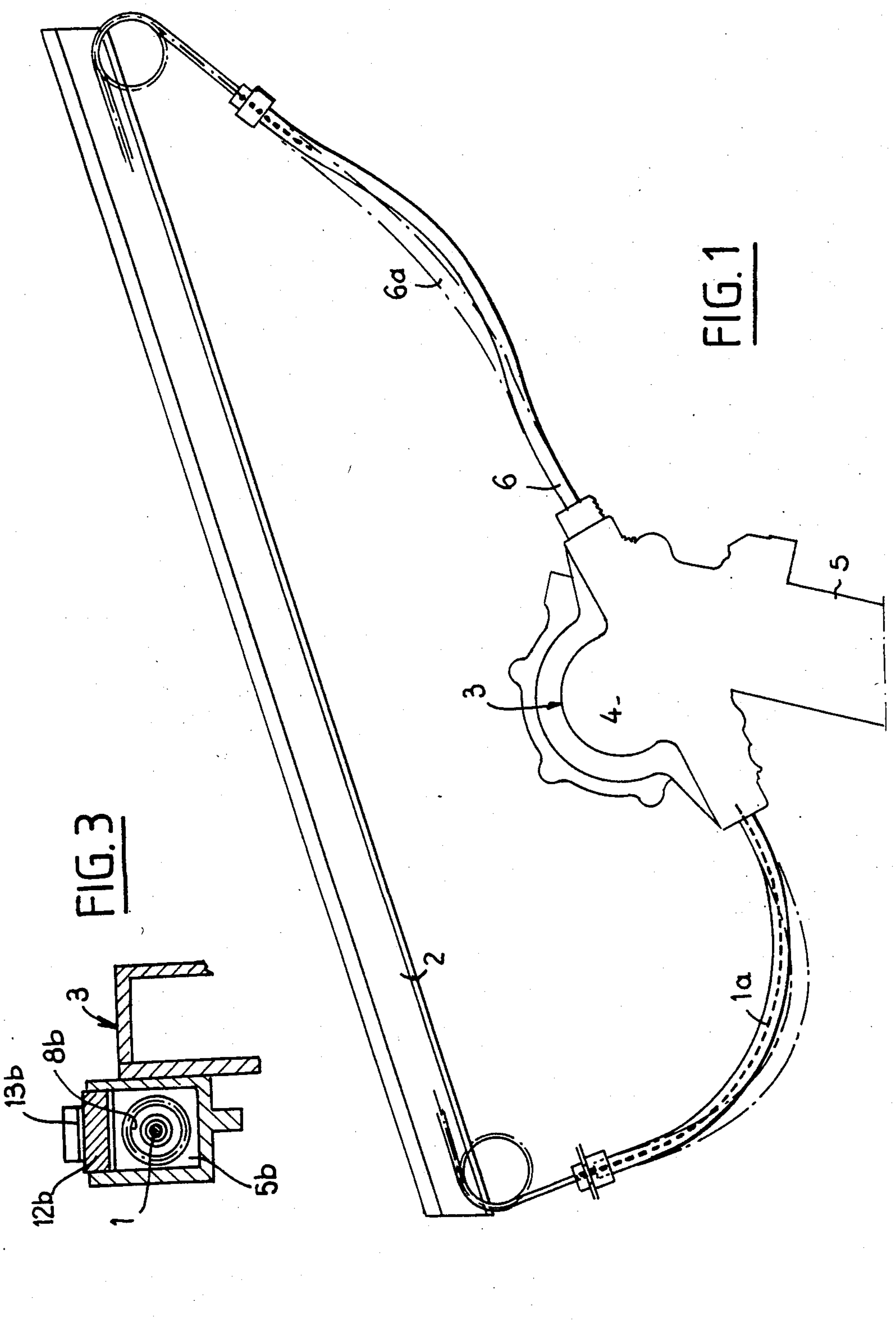
FIG. 1 is a semi-sectional, semi-elevational simplified view of an embodiment of the cable-tightening device for a motor vehicle glass raiser according to the invention.
FIG. 3 is a cross-sectional view taken on line III—III of FIG. 2.
Figure 2:
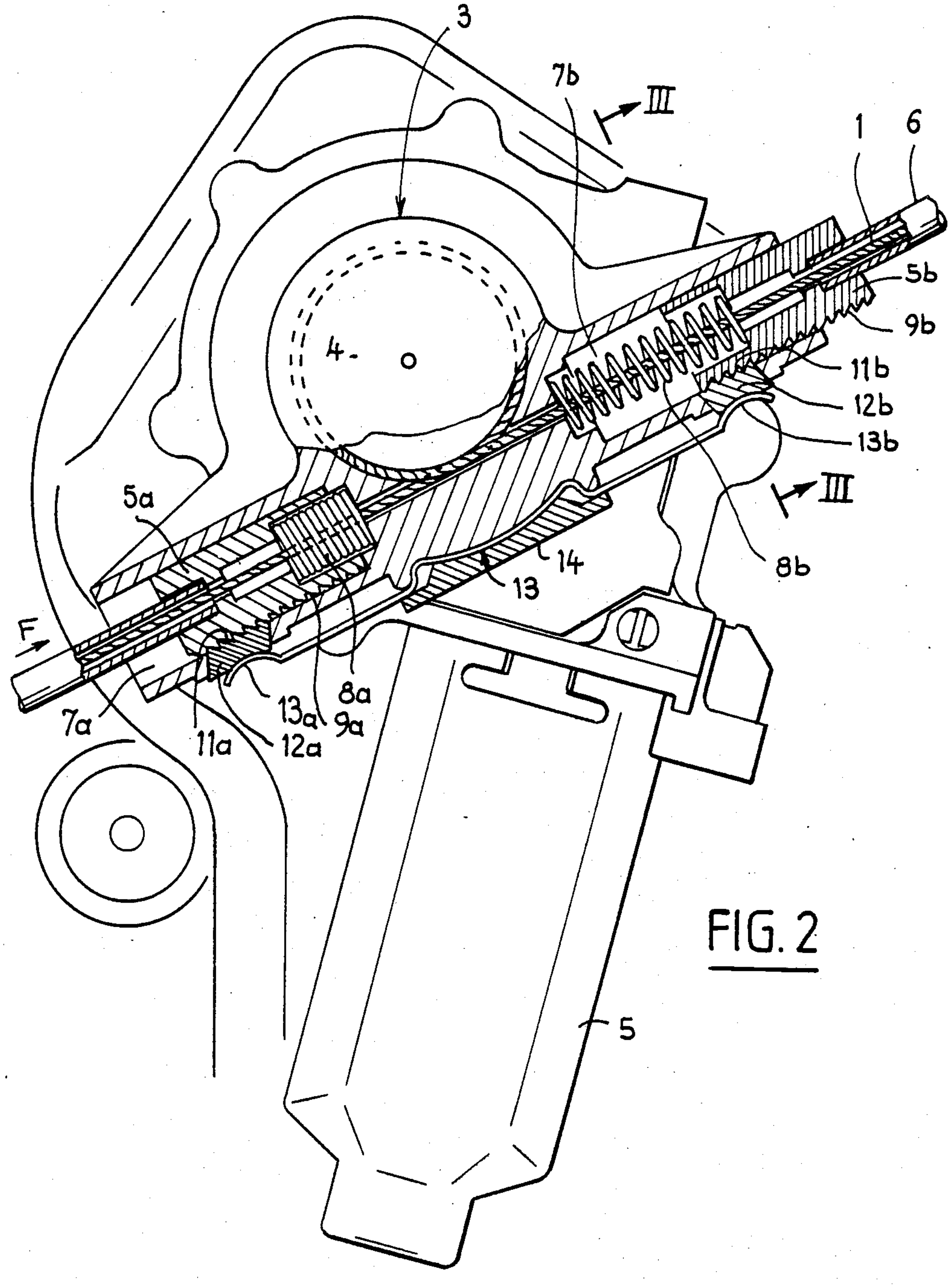
FIG. 2 is a partial sectional view to an enlarged scale of the device of FIG. 1

The device illustrated in FIGS. 1 to 3 is adapted to ensure the tightening of a unidirectional cable (Bowden cable) 1 of a motor vehicle glass raiser slidable on a rail 2 so as to raise or lower a window glass (not shown).

This device comprises a housing 3 in which is disposed a winch 4 for driving the cable 1 and capable of being driven, either manually or by means of a suitable motor such as a motor-speed reducer unit 5, in the known manner. The housing 3, through which the cable 1 extends, also contains two end members 5*a*, 5*b*, each receiving one end of a sheath 6 containing a cable 1, each end member 5*a*, 5*b* being disposed in a corresponding cavity 7*a*, 7*b* of the housing 3. The end members 5*a*, 5*b* are positioned on each side of the winch 4 around which the cable 1 is wound. Each end member 5*a*, 5*b* is elastically biased by a compression spring 8*a*, 8*b* which is mounted coaxially with the cable 1 in the respective cavity 7*a*, 7*b* and bears against the inner end of the latter.

In the position of maximum compression of the spring 8*a*, such as shown in the left part of FIG. 1, the associated end member 5*a* is completely inserted inside the cavity 7*a* and is subjected to a maximum force on the part of the spring 8*a* which tends to bias the end member 5*a* outwardly of the cavity.

Each end member 5*a*, 5*b* preferably has the shape of a parallelepiped and is provided according to the invention, on one of its sides, with a respective set of teeth 9*a*, 9*b* which extends in a direction parallel to the cable 1 but has teeth which extend transversely of the latter. Each set of teeth 9*a*, 9*b* engages with a complementary set of teeth 11*a*, 11*b* of a respective shoe 12*a*, 12*b* disposed in the housing 3 in such manner as to be slightly slidable in a direction transverse to the cable 1, when the corresponding end member 5*a*, 5*b* travels in a direction parallel to the cable 1. Means are moreover provided for maintaining the shoes 12*a*, 12*b* elastically bearing against the toothed sides 9*a*, 9*b* of the associated end members 5*a*, 5*b*.

In the illustrated embodiment, these means for elastically maintaining the shoes 12*a*, 12*b* against the sets of teeth 9*a*, 9*b* are formed by a spring strip 13 which is secured to the housing 3 by any suitable means known per se, such as an element 14, and which has two opposed end portions 14*a*, 14*b* which elastically bear against the shoes 12*a*, 12*b* respectively.

This device operates in the following manner:

With the springs 8*a*, 8*b* tightening the cable 1 in the two directions of the actuation of the latter, when one of the portions of the cable 1 is a driving portion, the sheath 6 exerts on the corresponding end member 5*a* or 5*b* a compression force. This force is transmitted through the set of teeth 9*a* or 9*b* to the shoe 12*a* or 12*b* which in turn transmits it to the housing 3. At the beginning, the end members 5*a*, 5*b* are urged into their cavity 7*a*, 7*b* to the maximum extent and are in abutting relation to the inner end of the latter with the respective spring 8*a*, 8*b* compressed to the maximum extent with its coils in adjoining relation as illustrated in the left part of FIG. 1.

When the portion 1*a* of the cable 1 on the left side of FIG. 1 is a driving portion, the corresponding part of the sheath 6 exerts on the end member 5*a* a compression force F which tends to maintain it in its position inside the cavity 7*a*. The sets of teeth 9*a*, 11*a* are inclined in the direction which opposes this force F, which therefore has for effect to maintain the corresponding sets of teeth 9*a* and 11*a* in engagement. The sets of teeth 9*b*, 11*b* are inclined in the opposite direction to that of the other two sets of teeth 9*a*, 11*a*. The end portions 13*a*, 13*b* of the spring 13 have no retaining function but merely maintain the shoes 12*a*, 12*b* in contact with the end members 5*a*, 5*b*.

In the opposite direction to the preceding direction, the considered portion of the cable 1 is "slack" so that the corresponding part of the sheath 6 no longer exerts on the end member a compression force. The considered spring 8*a* or 8*b* can then bias the end member 5*a* or 5*b* so as to tighten the cable 1. The sets of teeth 9*a*, 11*a*, and 9*b*, 11*b* are oriented as already mentioned in the direction which permits the sliding of the end member 5*a* or 5*b* outwardly of the cavity 7*a* or 7*b*. The spring 8*a* or 8*b* then exerts on the end member 5*a* or 5*b* a thrust which causes a slight transverse displacement of the shoe 12*a* or 12*b*, in opposition to the elastic return force exerted by the end portion 13*a* or 13*b* of the spring 13, until the set of teeth 9*a* or 9*b* has advanced one step or pitch with respect to the set of teeth 11*a* or 11*b*, the cable 1 being again tightened at the end of this advance of the end member 5*a* or 5*b*.

The end member 5*b* has been shown in the right part of FIG. 1 in its position of the maximum taking up of play, the spring 8*b* being partly released and the tightened sheath 6 being shown in full lines, while, in the position of maximum insertion of the end member 5*b*, the tightened position 6*a* of the sheath is shown in dot-dash lines. In the left part of FIG. 1, the sheath and its cable 1*a* are shown, in full lines, tightened in the initial position, and, in dot-dash lines, tightened after the sliding of the end member 5*a* on the shoe 12*a*.

During the operation of this device, the spring strip 13 is only slightly stressed, and this permits, by way of a modification, constructing the assembly of the two shoes 12*a*, 12*b* and the spring 13 in a single piece of moulded plastics material.

In the initial position, the two springs 8*a*, 8*b* are compressed to a maximum with their coils in adjoining relation to one another, as can be seen in the left part of FIG. 2. When play to be taken up appears, the concerned spring urges the associated end member through one step or pitch, which maintains the cable 1 in the tightened condition and ensures the rigidity of the connection in the direction of the compression of the sheath 6 between the end member and its support portion of the housing 3. Consequently, when a force is exerted on the window glass, it is only possible to make it descend to an extent corresponding to one step or pitch of the set of teeth 9*a*, 9*b*, i.e. in fact a maximum distance of 1 to 2 mm.

As a modification, the spring 13 could be replaced by two distinct springs, each acting on a shoe 12*a*, 12*b*. Also, the winch 4 may be driven manually,as already mentioned, since the invention is not limited to electrical window glass raisers.

What is claimed is:

1. A unidirectional cable-tightening device for a motor vehicle glass raiser, comprising a housing, a cable, driving winch and two end members disposed in the housing, a sheath containing a cable and having one end inserted in one of the end members and an opposite end inserted in the other end member, elastically yieldable means disposed in the housing for elastically biasing each end member, a set of teeth which extends in a direction parallel to said cable and provided on one side of each end member, a shoe associated with each end member and mounted in the housing in such manner as to be slidable transversely of the associated end member, each shoe having a set of teeth complementary to and engaged with the set of teeth of the associated end member in such manner that when the end member is moved in a direction parallel to the cable, the associated shoe is slightly moved transversely of the end member, means being provided for biasing the shoes elastically against the sets of teeth of the associated end members.

2. A device according to claim 1, wherein said elastically yieldable means comprise a compression coil spring mounted in the housing coaxially of the cable.

3. A device according to claim 1, wherein the means for biasing the shoes against the sets of teeth of the corresponding end members comprise at least one spring strip fastened to the housing and having opposed end portions which bear elastically against the shoes.

4. A device according to claim 3, wherein the shoes and the spring strip are arranged in the form of a single piece of moulded plastics material.

* * * * *